United States Patent
Sathe et al.

(10) Patent No.: US 11,363,753 B2
(45) Date of Patent: Jun. 21, 2022

(54) MOWER IMPLEMENT GUIDANCE SYSTEM

(71) Applicant: DEERE & COMPANY, Moline, IL (US)

(72) Inventors: Revati Sathe, Pune (IN); Raj Bhanushali, Pune (IN); Rajat Chaple, Saswad (IN)

(73) Assignee: DEERE & COMPANY, Moline, IL (US)

( * ) Notice: Subject to any disclaimer, the term of this patent is extended or adjusted under 35 U.S.C. 154(b) by 347 days.

(21) Appl. No.: 16/662,117

(22) Filed: Oct. 24, 2019

(65) Prior Publication Data

US 2021/0120727 A1 Apr. 29, 2021

(51) Int. Cl.
| | |
|---|---|
| *A01B 69/00* | (2006.01) |
| *A01B 69/04* | (2006.01) |
| *A01D 34/84* | (2006.01) |
| *B60W 30/10* | (2006.01) |
| *G05D 1/02* | (2020.01) |

(52) U.S. Cl.
CPC .......... *A01B 69/004* (2013.01); *A01B 69/008* (2013.01); *A01D 34/84* (2013.01); *B60W 30/10* (2013.01); *G05D 1/0219* (2013.01); *G05D 1/0231* (2013.01); *G05D 2201/0201* (2013.01)

(58) Field of Classification Search
CPC combination set(s) only.
See application file for complete search history.

(56) References Cited

U.S. PATENT DOCUMENTS

| | | | |
|---|---|---|---|
| 4,555,725 A | 11/1985 | Geiersbach et al. | |
| 5,031,704 A | 7/1991 | Fleischer et al. | |
| 5,181,572 A | 1/1993 | Andersen et al. | |
| 5,255,756 A * | 10/1993 | Follmer ............... | A01B 69/004 172/6 |
| 6,216,795 B1 | 4/2001 | Buehl | |

(Continued)

FOREIGN PATENT DOCUMENTS

| | | |
|---|---|---|
| DE | 4301029 A1 | 7/1993 |
| EP | 2272312 A1 | 1/2011 |

(Continued)

OTHER PUBLICATIONS

European Search Report issued in counterpart application No. 20202763.7 dated Mar. 9, 2021 (07 pages).

*Primary Examiner* — Jeff A Burke
*Assistant Examiner* — Madison B Emmett

(57) ABSTRACT

A method of controlling a mower implement includes sensing a separation distance between the mower implement and an adjacent windrow with an outboard distance sensor. The sensed separation distance is then compared to a defined separation target. The computing device indicates that a course of the mower implement is on-target when the separation distance is approximately equal to the defined separation target. The computing device indicates that the course of the mower implement is drifting in a first direction when the separation distance is less than the defined separation target and greater than zero. An offset distance is sensed between the mower implement and a standing crop edge. The computing device indicates that the course of the mower implement is drifting in a second direction when both the separation distance and the offset distance are substantially equal to zero.

13 Claims, 3 Drawing Sheets

(56) References Cited

U.S. PATENT DOCUMENTS

| | | | | |
|---|---|---|---|---|
| 6,804,597 | B1* | 10/2004 | Posselius | A01B 79/005 |
| | | | | 701/468 |
| 7,400,957 | B2 | 7/2008 | Hofer et al. | |
| 2006/0191250 | A1 | 8/2006 | Neuerburg et al. | |
| 2008/0228353 | A1* | 9/2008 | Mayfield | A01B 69/008 |
| | | | | 701/41 |
| 2011/0118926 | A1* | 5/2011 | Peake | G01C 21/34 |
| | | | | 701/25 |
| 2013/0008360 | A1 | 1/2013 | Follmer | |
| 2014/0083071 | A1* | 3/2014 | Fay, II | A01D 43/006 |
| | | | | 56/15.6 |
| 2015/0253427 | A1* | 9/2015 | Slichter | G01S 17/42 |
| | | | | 356/5.01 |
| 2016/0309655 | A1* | 10/2016 | Treffer | A01D 43/04 |
| 2016/0363936 | A1 | 12/2016 | Peake et al. | |
| 2018/0068566 | A1* | 3/2018 | Prasad | B60W 30/12 |
| 2018/0116116 | A1* | 5/2018 | Graeve | A01D 43/10 |
| 2018/0325013 | A1* | 11/2018 | Boydens | A01F 15/08 |
| 2018/0325024 | A1 | 11/2018 | Rotole et al. | |
| 2020/0053962 | A1* | 2/2020 | Dix | G05D 1/0278 |

FOREIGN PATENT DOCUMENTS

| | | | |
|---|---|---|---|
| EP | 2710875 | A1 | 3/2014 |
| EP | 3315004 | A1 | 5/2018 |
| EP | 3342274 | A1 | 7/2018 |
| EP | 3400783 | A1 | 11/2018 |

* cited by examiner

MOWER IMPLEMENT GUIDANCE SYSTEM

TECHNICAL FIELD

The disclosure generally relates to mower implement having a guidance system, and a method of controlling the mowing implement with the guidance system.

BACKGROUND

A mower implement is used for cutting or mowing crop material, e.g., hay. In some embodiments, the mower implement is drawn behind and laterally offset from another vehicle, such as but not limited to an agricultural tractor. The mower implement includes a cutting system that is configured to cut the crop material as it enters through a front of the mower implement. The cut crop material is formed into a windrow as it is discharged through a rear of the mower implement. The width of the windrow is less than a cutter width of the mower implement. As the mower implement is moved back-and-forth through a field, the windrows are formed in a generally parallel relationship.

In order to maximize efficiency, the entire cutter width of the mower implement should be utilized, without drifting left or right. If the mower implement drifts away from the standing crop, then the mower implement is not utilizing it's full cutter width. If the mower implement drifts into the standing crop, then crop material may be left standing, i.e., uncut. When the mower implement is drawn behind the agricultural vehicle, the operator must look rearward to watch the mower implement, and look forward to steer the agricultural vehicle, making it difficult to maintain a proper alignment or efficient course of the mower implement.

SUMMARY

A mower implement is provided. The mower implement includes a body having a front edge, a rear edge, a first side edge, and a second side edge. The body is configured for movement in a direction parallel to a central longitudinal axis of the body, which extends between the front edge and the rear edge of the body. A cutter is coupled to the body and is operable to cut crop material entering through the front edge of the body. A swathboard is coupled to the body and is operable to form cut crop material exiting through the rear edge of the body into a windrow. A distance sensor is coupled to the body and is positioned to sense a distance between the first side edge of the body and at least one of an outboard windrow laterally offset outboard of the body relative to the central longitudinal axis, or a standing crop edge entering the front edge of the body. A computing device is disposed in communication with the distance sensor. The computing device includes a processor and a memory having a guidance algorithm stored therein. The processor is operable to execute the guidance algorithm to receive a signal from the distance sensor indicating the distance, and indicate a lateral drift direction of the body relative to the central longitudinal axis of the body, based on the signal from the distance sensor.

In one aspect of the disclosure, the distance sensor may include an outboard distance sensor positioned to sense a separation distance between the first side edge of the body and the outboard windrow. The separation distance is measured perpendicular to the central longitudinal axis of the body. The processor is operable to execute the guidance algorithm to indicate that the lateral drift direction is a first direction, e.g., leftward, when the separation distance is greater than zero and less than a defined separation target. The cutter defines a cutting width, which is measured perpendicular to the central longitudinal axis. In one embodiment, the defined separation target is approximately equal to one half the cutting width.

In one aspect of the disclosure, the distance sensor may include an inboard distance sensor positioned to sense an offset distance between the first side edge of the body and the standing crop edge. The offset distance is measured perpendicular to the central longitudinal axis of the body. The processor is operable to execute the guidance algorithm to indicate that the lateral drift direction is the first direction, e.g., leftward, when the offset distance is greater than zero. In another embodiment, the processor is operable to execute the guidance algorithm to indicate that the lateral drift direction is the first direction, e.g., leftward, when the separation distance is greater than zero and less than a defined separation target, and the offset distance is greater than zero.

In one aspect of the disclosure, the processor is operable to execute the guidance algorithm to indicate that the lateral drift direction is a second direction, e.g., rightward, when the separation distance is substantially equal to zero or a default value, and the offset distance is substantially equal to zero or a default value.

In one aspect of the disclosure, the computing device includes a visual display, and the processor is operable to execute the guidance algorithm to display indicia on the visual display to indicate the lateral drift direction. For example, if the mower implement is on-target, the indicia may include a pair of parallel lines indicating to the operator to maintain the current path, whereas if the mower implement is drifting left, the indicia may include an arrow indicating to veer the mower implement to the right, and if the mower implement is drifting right, the indicia may include an arrow indicating to veer the mower implement to the left.

In another aspect of the disclosure, a steering system may be disposed in communication with the computing device. The steering system may be part of the mower implement, or may be a steering system of the tow vehicle, e.g., an agricultural tractor. The steering system is operable to move the body of the mower implement laterally relative to the central longitudinal axis. The processor is operable to execute the guidance algorithm to control the steering system based on the lateral drift direction, in order to maintain the separation distance at the defined separation target.

A method of controlling a mower implement is also provided. The method includes defining a value for a separation target. The separation target is the desired distance between an outboard windrow that is laterally offset outboard of the body relative to the central longitudinal axis of the body, and a side edge of the mower implement. A separation distance is sensed with an outboard distance sensor of the mower implement. The separation distance is sensed between the first side edge of the body of the mower implement and the outboard windrow. The separation distance is measured perpendicular to the central longitudinal axis of the body. The sensed separation distance is then compared to the defined separation target with the computing device. The sensed separation distance is compared to the defined separation target to determine if the separation distance is approximately equal to the defined separation target, or if the separation distance is less than the defined separation target. The method further includes indicating that a course of the mower implement is on-target when the separation distance is approximately equal to the defined separation target. The indication is made with a communicator of the computing device.

In one aspect of the disclosure, when the separation distance is less than the defined separation target and greater than zero, the method includes indicating with the communicator a lateral drift direction of the body relative to the central longitudinal axis is a first direction.

In one aspect of the disclosure, the method further includes sensing an offset distance with an inboard distance sensor of the mower implement. The offset distance is sensed between the first side edge of a body and a standing crop edge entering a front edge of the mower implement. The offset distance is measured perpendicular to the central longitudinal axis of the body.

In one aspect of the disclosure, when the separation distance is substantially equal to zero or a default value, and the offset distance is substantially equal to zero or a default value, the communicator may indicate a lateral drift direction of the body relative to the central longitudinal axis is a second direction.

In one aspect of the disclosure, the computing device may control a steering system that is operable to move the body laterally relative to the central longitudinal axis. The computing device controls the steering system based on the sensed separation distance and/or the sensed offset distance, to maintain the sensed separation distance at the defined separation target.

In one aspect of the disclosure, the communicator includes a visual display. The computing device may indicate that the course of the mower implement is on-target, indicate a lateral drift direction in a first direction, and/or indicate a lateral drift direction in a second direction, by presenting a respective indicia element on the visual display for each relative position of the mower implement.

Accordingly, the outboard sensor is used to sense the separation distance separating the first side edge of the mower implement and an adjacent, outboard windrow, and the inboard sensor is used to sense the offset distance separating the first side edge of the mower implement and the standing crop edge. The computing device uses the separation distance and/or the offset distance to determine if the mower implement is on-target, drifting in a first direction, e.g., leftward, or drifting in a second direction, e.g., rightward. The course of the mower implement may then be indicated to an operator using the communicator of the computing device. The operator may then correct the course of the tractor to bring the mower implement back on-target, or may maintain the current course of the mower implement if it is currently on-target. Alternatively, the steering system of the tractor may be automatically controlled by the computing device to maintain the mower implement on the target course.

The above features and advantages and other features and advantages of the present teachings are readily apparent from the following detailed description of the best modes for carrying out the teachings when taken in connection with the accompanying drawings.

DETAILED DESCRIPTION

Figure 1:
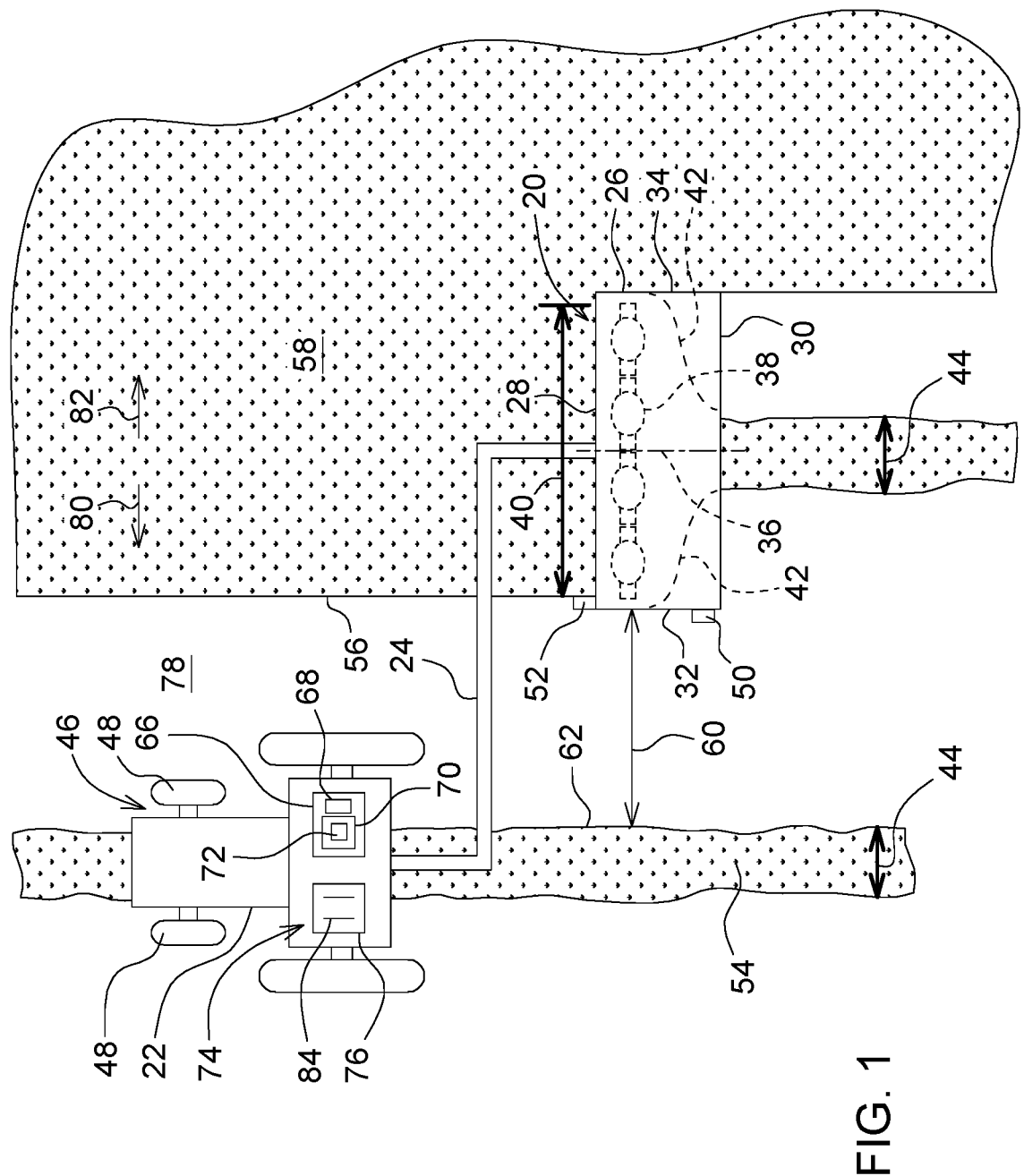
FIG. 1 is a schematic plan view of a mower implement in a field following an on-target course.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Referring to the Figures, wherein like numerals indicate like parts throughout the several views, a mower implement is generally shown at 20. In the example embodiment shown in the Figures and described herein, the mower implement 20 is drawn behind and laterally offset to a side of an agricultural vehicle, e.g., a tractor 22 such as shown in the Figures. It should be appreciated that in other example embodiments, the mower implement 20 may be drawn directly behind the tractor 22, or drawn behind and to the other side of the tractor 22 than what tis shown in the Figures. A linkage or drawbar 24 connects the mower implement 20 to the tractor 22, and positions the mower implement 20 relative to the tractor 22. The specific manner in which the mower implement 20 and the tractor 22 are connected is not pertinent to the teachings of this disclosure, are known to those skilled in the art, and are therefore not described in detail herein.

The mower implement 20 may include any implement configured for cutting standing crop material. The example embodiment of the mower implement 20 shown in the Figures and described herein is embodied as a mower conditioner for cutting and conditioning hay. However, it should be appreciated that the mower implement 20 may be embodied as some other implement not described or shown herein.

The mower implement 20 includes a body 26 having a front edge 28, a rear edge 30, a first side edge 32, and a second side edge 34. The body 26 is configured for movement in a direction parallel to a central longitudinal axis 36 of the body 26. The central longitudinal axis 36 of the body 26 extends between the front edge 28 and the rear edge 30 of the body 26. As shown in the Figures, the first side edge 32 is represented as a left side edge as viewed on the page of the Figures, and the second side edge 34 is represented as a right side edge as viewed on the page of the Figures. However, it should be appreciated that the relative positions of the first side edge 32 and the second side edge 34 may be reversed from the example embodiment shown and described herein.

The mower implement 20 includes a cutter 38 or cutter system. The cutter 38 is coupled to the body 26 and is operable to cut crop material entering through the front edge 28 of the body 26. The cutter 38 may include any system capable of cutting the crop material. The specific type, configuration, and operation of the cutter 38 may depend upon the specific type of crop material being cut, and the function of the mower implement 20. For example, the cutter 38 may include a rotary cutter, a disc mounted cutter bar, etc. Various types of cutters for different mower implements 20 and for different crop materials are known to those skilled in the art, are not pertinent to the teachings of this disclosure, and are therefore not described in detail herein.

The cutter 38 defines a cutting width 40. The cutting width 40 is the width or distance over which the cutter 38 is operable to cut crop material. The cutting width 40 is measured perpendicular to the central longitudinal axis 36, and extends substantially across the front edge 28 of the body 26, between the first side edge 32 and the second side edge 34.

The mower implement 20 further includes a swathboard 42. The swathboard 42 is coupled to the body 26 and is operable to form cut crop material exiting through the rear edge 30 of the body 26 into a windrow. The swathboard 42 may include multiple board elements that cooperate to form the cut crop material into the windrow. The windrow that is discharged from the swathboard 42 is generally centered along the cutter 38 width, i.e., equidistant from both the first side edge 32 and the second side edge 34 of the body 26. As such, a center of the windrow formed by the swathboard 42 is centered between the first side edge 32 and the second side edge 34 of the body 26. The windrow defines a windrow width 44, which is measured perpendicular to the central longitudinal axis 36. The swathboard 42 may be adjustable to vary the windrow width 44. However, it should be appreciated that the windrow width 44 is less than the cutter 38 width.

The mower implement 20 is coupled to a steering system 46. The steering system 46 is operable to move the body 26. In the example embodiment shown in the Figures and described herein, the steering system 46 includes steerable front wheels 48 of the tractor 22. Because the mower implement 20 is drawn by the tractor 22, the mower implement 20 follows the direction of travel of the tractor 22. As is understood by those skilled in the art, turning the steerable front wheels 48 of the tractor 22 while the tractor 22 is moving in a forward direction moves the tractor 22 to one side or the other, which in turn moves the mower implement 20 to the same side. Accordingly, the steerable front wheels 48 of the tractor 22 are operable to move the mower implement 20 laterally. It should be appreciated that the steering system 46 described herein is an example, and that the steering system 46 may vary from the example embodiment described herein. Further, it should be appreciated that in other embodiments, the steering system 46 may be directly connected to the body 26 of the mower implement 20.

The mower implement 20 further includes at least one distance sensor 50, 52. The distance sensor 50, 52 is coupled to the body 26 and is positioned to sense a distance between the first side edge 32 of the body 26 and at least one of an outboard windrow 54 or a standing crop edge 56. The outboard windrow 54 is laterally offset outboard of the body 26 relative to the central longitudinal axis 36. The outboard windrow 54 is a windrow that was previously formed and that is laterally offset outboard of the body 26 of the mower implement 20, in a generally parallel relationship with the central longitudinal axis 36. The standing crop edge 56 is a line or longitudinal edge of the standing crop material entering the front edge 28 of the body 26. As used herein, the term "outboard" is defined as being positioned farther away from or facing away from a reference location, whereas the term "inboard" is defined as being positioned nearer or facing toward a reference location.

In the example embodiment shown in the Figures and described herein, the distance sensor 50, 52 includes an outboard distance sensor 50 and an inboard distance sensor 52. The outboard distance sensor 50 is attached to the body 26 and positioned to sense a separation distance 60 between the first side edge 32 of the body 26 and the outboard windrow 54. The separation distance 60 is measured perpendicular to the central longitudinal axis 36 of the body 26. The separation distance 60 is the distance between a nearest edge 62 of the outboard windrow 54, i.e., the previously formed windrow positioned laterally offset outboard of the body 26 and the first side edge 32.

The outboard sensor may include any type of sensor and/or combination of sensors and computing software that is capable of sensing or otherwise determining or calculating the separation distance 60. The outboard distance sensor 50 may include, but is not limited to, an optical sensor, a lidar sensor, a radar sensor, a doppler effect sensor, etc. The outboard distance sensor 50 may include multiple types of sensors, and be combined with software to analyze data and determine the separation distance 60.

The inboard distance sensor 52 is attached to the body 26 and is positioned to sense an offset distance 64 (shown in FIG. 2) between the first side edge 32 of the body 26 and the standing crop edge 56. The offset distance 64 is measured perpendicular to the central longitudinal axis 36 of the body 26. The offset distance 64 it the distance between the standing crop edge 56 and the first side edge 32 of the mower implement 20.

The inboard sensor may include any type of sensor and/or combination of sensors and computing software that is capable of sensing or otherwise determining or calculating the offset distance 64. The inboard distance sensor 52 may include, but is not limited to, an optical sensor, a lidar sensor, a radar sensor, a doppler effect sensor, etc. The inboard distance sensor 52 may include multiple types of sensors, and be combined with software to analyze data and determine the offset distance 64.

The mower implement 20 further includes a computing device 66. The computing device 66 may be integrated into the mower implement 20, or may be remote from the mower implement 20. In the example embodiment shown in the Figures and described herein, the computing device 66 is located in the tractor 22, and connected to the mower implement 20. In other embodiments, the computing device 66 may be located on the mower implement 20, and connected to the tractor 22. The computing device 66 is disposed in communication with the outboard distance sensor 50 and the inboard distance sensor 52. Additionally, the computing device 66 may be disposed in communication with and operable to control the steering system 46.

The computing device 66 may alternatively be referred to as a controller, a computer, a module, a control unit, a control module, etc. The computing device 66 includes a processor 68 and a memory 70 having a guidance algorithm 72 stored therein. Additionally, the computing device 66 may include all software, hardware, algorithms, connections, sensors, etc., necessary to execute the guidance algorithm 72. It should be appreciated that the computing device 66 may include any device capable of analyzing data from various sensors, comparing data, making the decisions, and executing tasks necessary to execute the guidance algorithm 72.

The computing device 66 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 70 may include any non-transitory/tangible medium which participates in providing data or computer-readable instructions. The memory 70 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory 70 devices such as flash memory.

Computing device 66 may further include a communicator 74. The communicator 74 may include, but is not limited to, a visual display 76, an audio output, a beacon, a haptic device, etc. For example, the communicator 74 may include a touchscreen display located in a cab of the tractor 22, and disposed in communication with the computing device 66. It should be appreciated that the communicator 74 may include some other device not described herein, that is capable of communicating a message.

As described above, the computing device 66 includes the tangible, non-transitory memory 70 on which are recorded computer-executable instructions, including the guidance algorithm 72. The processor 68 of the computing device 66 is configured for executing the guidance algorithm 72. The guidance algorithm 72 implements a method of controlling the mower implement 20.

The method of controlling the mower implement 20 includes defining a value for the separation target. The separation target is the desired distance between the first side edge 32 of the mower implement 20 and the nearest edge 62 of the outboard windrow 54 immediately adjacent to the mower implement 20. In the example embodiment described herein, the separation target is approximately equal to one half the cutter 38 width. However, the separation target may vary from the example embodiment. For example, the separation target may be defined to be slightly less than one half the cutter 38 width, such as by a few inches.

The separation distance 60 is sensed with the outboard distance sensor 50. As described above, the separation distance 60 is the distance measured perpendicular to the central longitudinal axis 36 of the mower implement 20 that is between the first side edge 32 of the body 26 and the nearest edge 62 of the outboard windrow 54. As described above, the outboard windrow 54 is laterally offset outboard of the body 26 relative to the central longitudinal axis 36 of the body 26.

The computing device 66 receives a signal from the outboard distance sensor 50 indicating the separation distance 60 and compares the sensed separation distance 60 to the defined separation target. The separation distance 60 is compared to the defined separation target to determine if the separation distance 60 is approximately equal to the defined separation target, or if the separation distance 60 is less than the defined separation target. As used herein, the separation distance 60 is substantially equal to the defined separation target if the separation distance 60 is within ten percent of the defined separation target.

Figure 3:
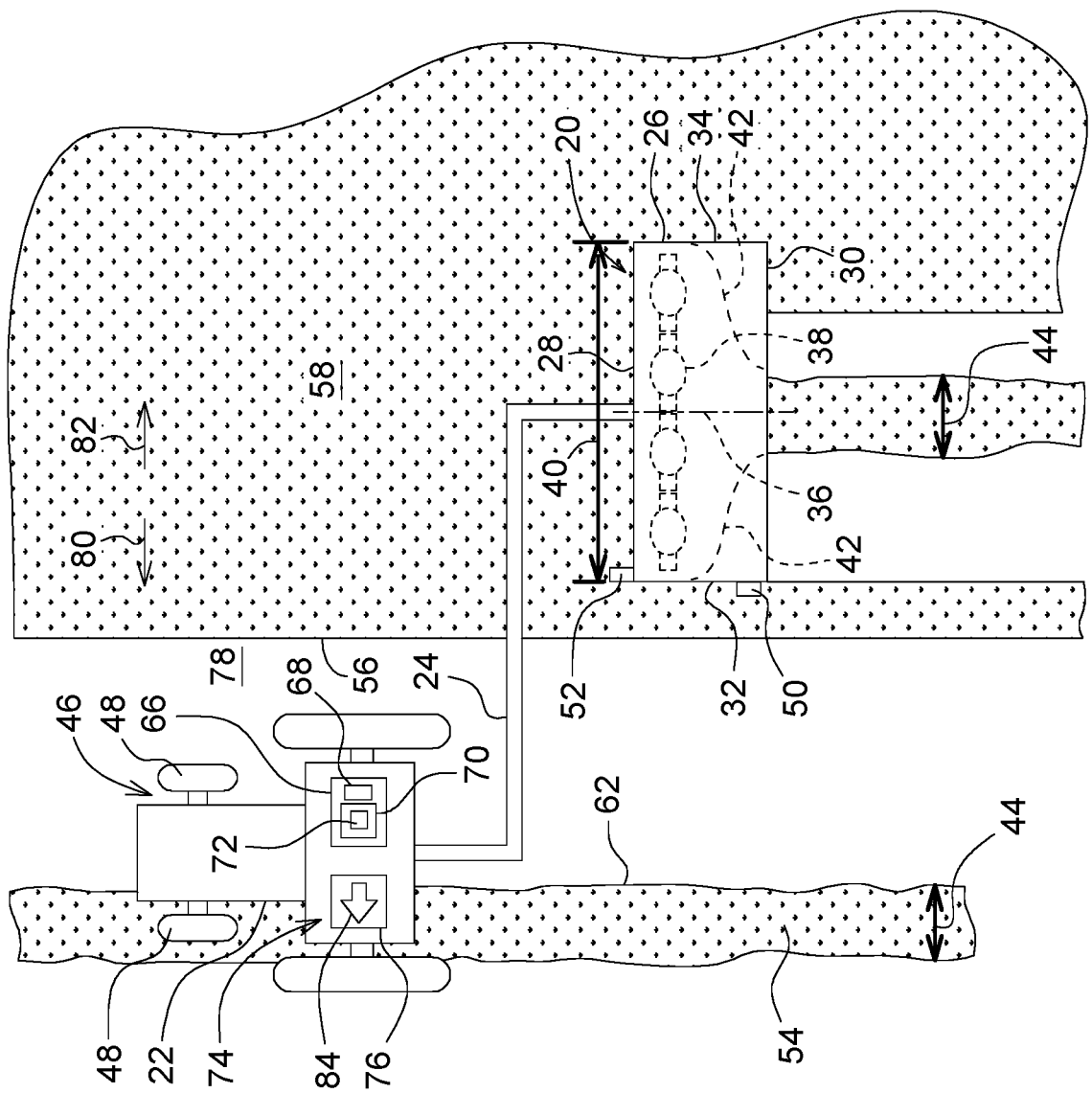
FIG. 3 is a schematic plan view of the mower implement in the field drifting in a second direction from the on-target course.

The computing device 66 further determines if the separation distance 60 is substantially equal to zero or an equivalent default value. As shown in the Figures, an open region 78 exits between the outboard windrow 54 and the standing crop edge 56. If the first side edge 32 of the mower implement 20 and/or the outboard distance sensor 50 are located in the open region 78, then the outboard distance sensor 50 should be able to sense the separation distance 60. However, if the mower implement 20 has drifted in a first direction 80 so far that the first side edge 32 of the mower implement 20 is located within the outboard windrow 54, or if the mower implement 20 has drifted in a second direction 82 so that the outboard distance sensor 50 is located beyond the standing crop edge 56 relative to the outboard windrow 54, such as shown in FIG. 3, the standing crop may be positioned immediately adjacent to the outboard distance sensor 50. Having standing crop disposed immediately adjacent to the outboard distance sensor 50 may obscure or block the outboard distance sensor 50, causing the outboard distance sensor 50 to sense a distance that is substantially equal to zero, or possible cause the outboard distance sensor 50 to output a default signal indicating that the outboard sensor was unable to sense a distance.

The offset distance 64 is sensed with the inboard distance sensor 52 of the mower implement 20. As described above, the offset distance 64 is the distance between the first side edge 32 of the body 26 and the standing crop edge 56 entering the front edge 28 of the mower implement 20. As described above, the offset distance 64 is measured perpendicular to the central longitudinal axis 36 of the body 26.

The computing device 66 receives a signal from the inboard distance sensor 52 indicating the offset distance 64. The computing device 66 further determines if the offset distance 64 is substantially equal to zero or an equivalent default value. As shown in the Figures, the open region 78 exists between the outboard windrow 54 and the standing crop edge 56. If the first side edge 32 of the mower implement 20 and/or the inboard distance sensor 52 are located in the open region 78, then the inboard distance sensor 52 should be able to sense the offset distance 64. However, if the mower implement 20 has drifted in the second direction 82 so that the inboard distance sensor 52 is located beyond the standing crop edge 56 relative to the outboard windrow 54, such as shown in FIG. 3, the standing crop may be positioned immediately adjacent to the inboard distance sensor 52. Having standing crop disposed immediately adjacent to the inboard distance sensor 52 may obscure or block the inboard distance sensor 52, causing the inboard distance sensor 52 to sense a distance that is substantially equal to zero, or possible cause the inboard distance sensor 52 to output a default signal indicating that the inboard sensor was unable to sense a distance.

The computing device 66 indicates a current course of the mower implement 20 relative to the standing crop edge 56, based on the signal from the outboard distance sensor 50 and/or the inboard distance sensor 52. The computing device 66 may indicate a lateral drift direction of the mower implement 20 relative to the standing crop edge 56. For example, the computing device 66 may indicate that the current course of the mower implement 20 is on-target, that the current course of the mower implement 20 is drifting in a first direction 80, or that the current course of the mower implement 20 is drifting in a second direction 82. As used herein, the first direction 80 is a leftward direction as viewed on the page of the Figures, and the second direction 82 is a rightward direction as viewed on the page of the Figures. However, it should be appreciated that the first direction 80 and the second direction 82 may be reversed from the example embodiment described herein.

In one embodiment, the communicator 74 includes the visual display 76. The computing device 66 may display indicia 84 on the visual display 76 to indicate the lateral drift direction. An indication that the mower implement 20 is on-target, is drifting in the first direction 80, or is drifting in the second direction 82, may each include presenting a respective indicia 84 element on the visual display 76. For example, when the mower implement 20 is on-target, the computing device 66 may display a straight line or other similar indicia 84 on the visual display 76 to indicate no current drift. When the mower implement 20 is drifting in the first direction 80 the computing device 66 may display an arrow or other similar indicia 84 on the visual display 76, pointing in the first direction 80, to indicate that the mower implement 20 is drifting in the first direction 80. Alternatively, when the mower implement 20 is drifting in the first direction 80, the computing device 66 may display an arrow or other similar indicia 84 on the visual display 76, pointing in the second direction 82, indicating that the operator needs to move the mower implement 20 in the second direction 82 to bring the course of the mower implement 20 back on-target. It should be appreciated that the indicia 84 may include other symbology other than the exemplary arrows noted above. For example, the indicia 84 may include text or some other picture capable of conveying the current course or position of the mower implement 20 relative to the standing crop edge 56 to the operator. Furthermore, it should be appreciated that the communicator 74 may include a device other than the visual display 76, such as a speaker, or light, etc., and that the manner in which the current position of the mower implement 20 is indicated is dependent upon the type of communicator 74 used.

Referring to FIG. 1, the computing device 66 may indicate, via the communicator 74, that the course of the mower implement 20 is on-target when the separation distance 60 is approximately equal to the defined separation target. As noted above, the separation distance 60 is substantially equal to the defined separation target if the separation distance 60 is within ten percent of the defined separation target.

Figure 2:
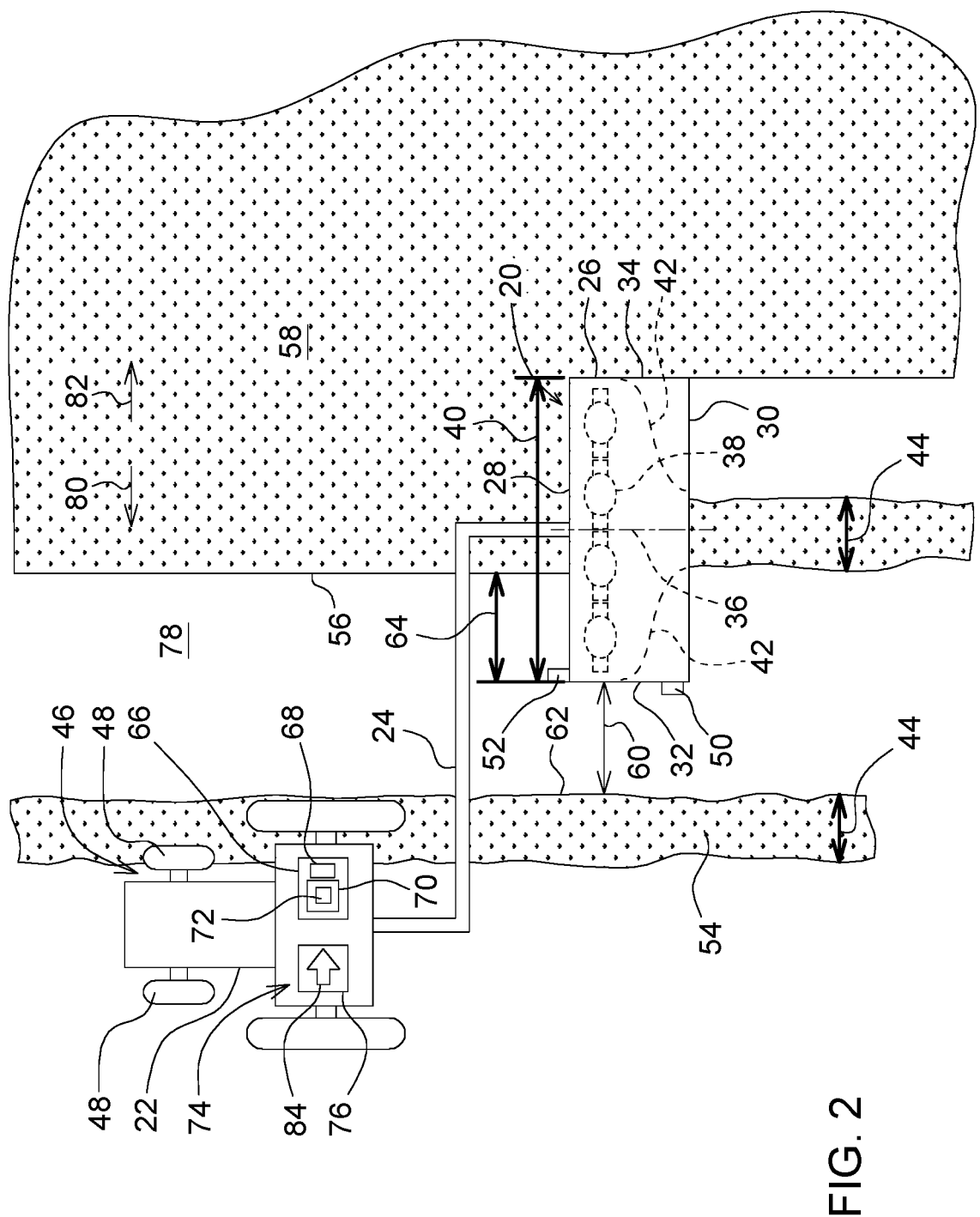
FIG. 2 is a schematic plan view of the mower implement in the field drifting in a first direction from the on-target course.

Referring to FIG. 2, the computing device 66 may indicate, via the communicator 74, that the course of the mower implement 20 has a lateral drift direction in the first direction 80, relative to the standing crop edge 56, when the separation distance 60 is less the defined separation target and greater than zero. When the separation distance 60 is less than the defined separation target, the left side edge of the mower implement 20 is closer to the outboard windrow 54 than desired, thereby indicating a drift in the first direction 80. When the separation distance 60 is greater than zero, the left side edge of the mower implement 20 is capable of sensing the separation distance 60, and therefore is most likely located in the open region 78 between the outboard windrow 54 and the standing crop edge 56. If the left side edge of the mower implement 20 was located to the right of the standing crop edge 56 or to the left of the outboard windrow 54, then the standing crop would be adjacent to the outboard sensor and the outboard sensor would sense a distance that is substantially equal to zero or output a default signal.

Referring to FIG. 2, the computing device 66 may indicate, via the communicator 74, that the course of the mower implement 20 has a lateral drift direction in the first direction 80, relative to the standing crop edge 56, when the offset distance 64 is greater than zero. When the offset distance 64 is greater than zero, the first side edge 32 of the mower implement 20 is located farther from the standing crop edge 56 than desired, is likely disposed in the open region 78, and thereby indicates a drift in the first direction 80.

Referring to FIG. 3, the computing device 66 may indicate, via the communicator 74, that the course of the mower implement 20 has a lateral drift direction in the second direction 82, relative to the standing crop edge 56, when the separation distance 60 is substantially equal to zero and the offset distance 64 is substantially equal to zero. When the left side edge of the mower implement 20 is located to the right of the standing crop edge 56, then the standing crop would be adjacent to both the outboard sensor and the inboard sensor, and both the outboard sensor and the inboard sensor would sense a distance that is substantially equal to zero or output a default signal, thereby indicating that the mower implement 20 has drifted in the second direction 82.

The computing device 66 may further control the steering system 46 based on the sensed separation distance 60 and/or the sensed offset distance 64, to maintain the sensed separation distance 60 at the defined separation target. Based on the logic described above, the computing device 66 may use the separation distance 60 and/or the offset distance 64 to determine if the course of the mower implement 20 relative to the standing crop edge 56 is on-target, is drifting in the first direction 80, or drifting in the second direction 82. Once the current course of the mower implement 20 is determined, the computing device 66 may control the steering system 46 to maintain or return the mower implement 20 to the desired position relative to the standing crop edge 56. For example, the computing device 66 may control a hydraulic system or electronic actuators to control the front steerable wheels 48 of the tractor 22 to cause the tractor 22 and thereby the mower implement 20 to move in either the first direction 80 or the second direction 82 relative to the standing crop edge 56. The manner in which the computing system controls the steering system 46 is dependent upon the type and configuration of the steering system 46, is known to those skilled in the autonomous vehicle operation art, and is therefore not described in detail herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A mower implement comprising:
   a body having a front edge, a rear edge, a first side edge, and a second side edge, wherein the body is configured for movement in a direction parallel to a central longitudinal axis that extends between the front edge and the rear edge of the body;
   a cutter coupled to the body and operable to cut crop material entering through the front edge of the body;
   a swathboard coupled to the body and operable to form cut crop material exiting through the rear edge of the body into a windrow;
   an outboard distance sensor coupled to the body and positioned to sense a separation distance between the first side edge of the body and an outboard windrow, wherein the separation distance is measured perpendicular to the central longitudinal axis of the body;
   an inboard distance sensor coupled to the body and positioned to sense an offset distance between the first side edge of the body and a standing crop edge, wherein the offset distance is measured perpendicular to the central longitudinal axis of the body;

a computing device disposed in communication with the distance sensor, wherein the computing device includes a processor and a memory having a guidance algorithm stored therein, wherein the processor is operable to execute the guidance algorithm to:

receive a signal from the outboard distance sensor indicating the separation distance;

receive a signal from the inboard distance sensor indicating the offset distance;

indicate a lateral drift direction of the body relative to the standing crop edge, based on the signal from the outboard distance sensor and the inboard distance sensor;

indicate that the lateral drift direction is a first direction when the separation distance is greater than zero and less than a defined separation target; and indicate that the lateral drift direction is a second direction when the separation distance is substantially equal to a default value, and the offset distance is substantially equal to the default value.

2. The mower implement set forth in claim 1, wherein the cutter defines a cutting width measured perpendicular to the central longitudinal axis, and wherein a defined separation target is approximately equal to one half the cutting width.

3. The mower implement set forth in claim 1, wherein the processor is operable to execute the guidance algorithm to indicate that the lateral drift direction is a first direction when the offset distance is greater than zero.

4. The mower implement set forth in claim 1, wherein the processor is operable to execute the guidance algorithm to indicate that the lateral drift direction is a first direction when the separation distance is greater than zero and less than a defined separation target, and the offset distance is greater than zero.

5. The mower implement set forth in claim 1, wherein the computing device includes a visual display, and the processor is operable to execute the guidance algorithm to display indicia on the visual display to indicate the lateral drift direction.

6. The mower implement set forth in claim 1, further comprising a steering system in communication with the computing device and operable to move the body laterally relative to the central longitudinal axis, and wherein the processor is operable to execute the guidance algorithm to control the steering system based on the lateral drift direction to maintain the separation distance at the defined separation target.

7. The mower implement set forth in claim 1, wherein the default value is substantially equal to zero.

8. A method of controlling a mower implement, the method comprising:

defining a value for a separation target;

sensing a separation distance, with an outboard distance sensor of the mower implement, between a first side edge of a body of the mower implement and an outboard windrow that is laterally offset outboard of the body relative to a central longitudinal axis of the body, wherein the separation distance is measured perpendicular to the central longitudinal axis of the body;

comparing the sensed separation distance to the defined separation target, with a computing device, to determine if the separation distance is approximately equal to the defined separation target, or if the separation distance is less than the defined separation target;

indicating, with a communicator of the computing device, that a course of the mower implement is on-target when the separation distance is approximately equal to the defined separation target;

sensing an offset distance, with an inboard distance sensor of the mower implement, between the first side edge of a body and a standing crop edge entering a front edge of the mower implement, wherein the offset distance is measured perpendicular to the central longitudinal axis of the body;

indicating, with the communicator, a lateral drift direction of the body relative to the standing crop edge is a second direction when the separation distance is substantially equal to a default value and the offset distance is substantially equal to the default value; and controlling, with the computing device, a steering system that is operable to move the body laterally relative to the central longitudinal axis, based on the sensed separation distance, to maintain the sensed separation distance at the defined separation target.

9. The method set forth in claim 8, further comprising indicating, with the communicator, a lateral drift direction of the body relative to a standing crop edge is a first direction when the separation distance is less than the defined separation target and greater than zero.

10. The method set forth in claim 8, wherein indicating that the course of the mower implement is on-target when the separation distance is approximately equal to the defined separation target is further defined as indicating that the course of the mower implement is on-target when the separation distance is approximately equal to the defined separation target and the offset distance is substantially equal to zero or a default value.

11. The method set forth in claim 8, further comprising indicating, with the communicator, a lateral drift direction of the body relative to the standing crop edge is a second direction when the separation distance is substantially equal to zero and the offset distance is substantially equal to zero.

12. The method set forth in claim 8, wherein the communicator includes a visual display, and wherein indicating that the course of the mower implement is on-target, indicating a lateral drift direction in a first direction, and indicating a lateral drift direction in a second direction, each include presenting a respective indicia element on the visual display.

13. The method set forth in claim 8, wherein the default value is substantially equal to zero.

* * * * *